W. D. MURRAY.
FRUIT SIZING MACHINE.
APPLICATION FILED JUNE 3, 1911.
1,013,092.
Patented Dec. 26, 1911.
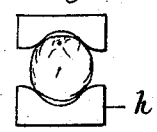
Fig. 5.
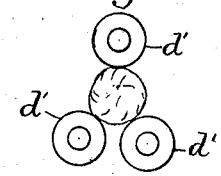
Fig. 4.
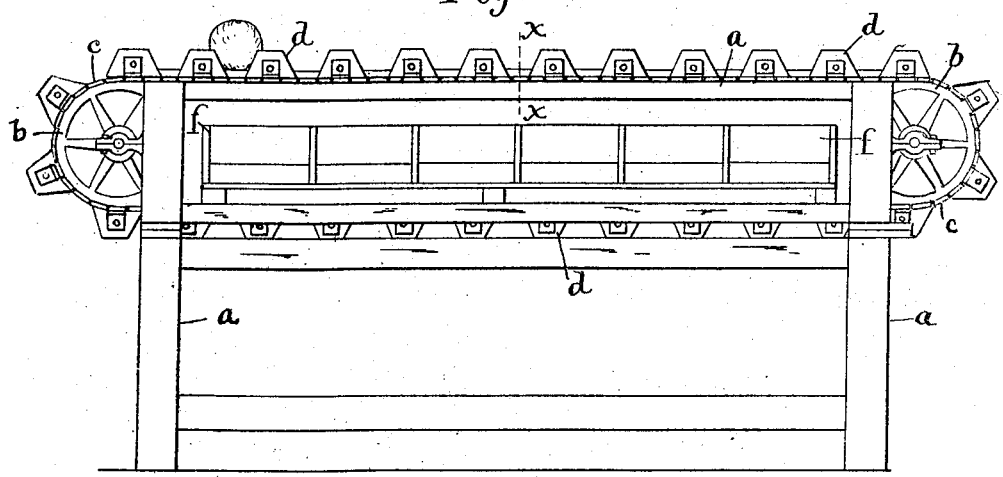
Fig. 1.
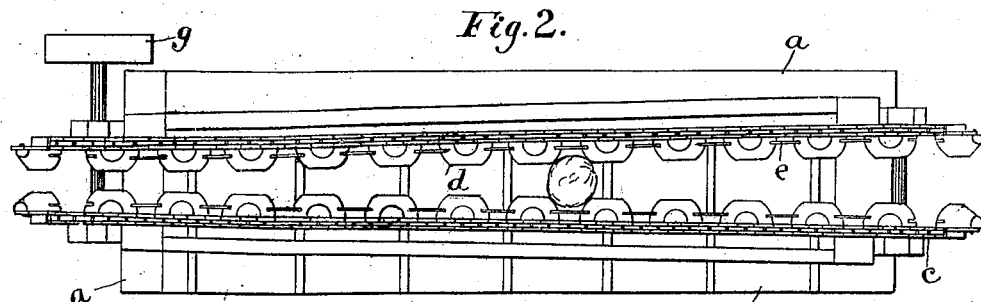
Fig. 2.
Fig. 3.
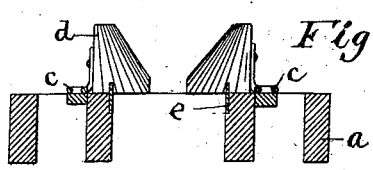
Witnesses:
Inventor:
Walter D. Murray
by S. W. Bates
Atty.

UNITED STATES PATENT OFFICE.

WALTER D. MURRAY, OF PORTLAND, MAINE, ASSIGNOR OF ONE-HALF TO GEORGE H. LIBBY, OF PORTLAND, MAINE.

FRUIT-SIZING MACHINE.

1,013,092.

Specification of Letters Patent.  Patented Dec. 26, 1911.

Application filed June 3, 1911. Serial No. 631,012.

*To all whom it may concern:*

Be it known that I, WALTER D. MURRAY, of Portland, in the county of Cumberland and State of Maine, have invented certain new and useful Improvements in Fruit-Sizing Machines, of which the following is a specification.

My invention relates to machines for sizing fruit such as oranges, lemons, grape fruit and it may also be used for the sizing of any articles similarly shaped which require to be graded according to size.

The object of my invention is to produce a machine in which the fruit may be sized and graded using more than one diameter and which shall do the grading without rolling or tumbling the fruit. These objects are accomplished by means of the machine herein shown and claimed.

I illustrate my invention by means of the accompanying drawing, in which is shown a fruit sizing machine constructed according to my invention.

In the drawing, Figure 1 is a side elevation of my machine, Fig. 2 is a plan of the same, and Fig. 3 is a cross section on the line X X of Fig. 1. Figs. 4 and 5 show modified forms of supporting blocks.

In the drawing, $a$ represents a suitable framework on which the moving parts of the machine are mounted.

The fruit is graded by means of two endless conveyers placed side by side with diverging paths and carrying a series of supporting blocks which carry the fruit and drop it at the appropriate point according to its size. As here shown, I provide a pair of sprocket wheels $b$ at each end of the machine with two endless chains $c$ running over the sprocket wheels. The sprocket wheels at the rear end of the machine are separated so that the paths of the two chains will diverge from front to rear, forming an intermediate space which grows gradually wider. Carried by the sprocket chains are supporting blocks which hold the fruit suspended over the space between the chains until the divergence of the chains causes them to be dropped. As here shown, these supporting blocks $d$ are conical on their supporting sides being preferably made in the form of a truncated cone cut in halves. The conical or working sides of the blocks $d$ are turned inward and they are secured to the chain $c$ on the perpendicular or back side. In order to guide the blocks and hold them in an accurate path, I provide a guide strip $e$ which engages a slot cut in the under side of each block. The blocks are disposed in pairs uniformly along the chains so that the fruit will ordinarily be held in place by contact with two opposite pairs of blocks, that is, the fruit will be graded by two diameters and will not drop until supports are withdrawn in the direction of both diameters.

Laterally extending chutes $f$ are provided for catching the fruit as it falls through between the blocks whereby the various grades are separated.

Suitable actuating means are provided for operating the conveyers as the pulley $g$.

In practice, the fruit is fed to the machine one at a time by hand or delivered to the machine by other suitable means. In grading oranges each orange is placed between four of the supporting blocks and it is carried along until the paths of the conveyers diverge sufficiently so that the orange is dropped into its appropriate chute. The oranges may be disposed in the supporting recess in any desired way, that is, the longest diameter may be placed diagonally so that it will determine the gage or the two diameters may be averaged or any other system of grading may be used.

While I have shown the supporting blocks as conical in form and as arranged in opposite pairs, they may be otherwise formed and the fruit may be supported by a single pair of opposite blocks having suitable conformation as shown in Fig. 5. In this case, we have two opposite blocks as $h$ having recessed sides so formed that the orange is supported at four points and gaged by the greater of its two diameters.

The blocks may, if desired, be arranged to support the fruit at three points as shown in Fig. 4, where the blocks $d'$ $d'$ are arranged one opposite the space between an opposite pair giving three points of support. This arrangement may be effected in my machine by simply moving the two chains longitudinally on the sprocket wheels with relation to each other bringing the blocks so that they alternate on opposite sides.

I claim:—

1. In a machine for sizing fruit, the combination of a pair of endless conveyers arranged to travel side by side in diverging paths, each of said conveyers having a series of pairs of supporting blocks conical on their supporting sides and spaced to support the fruit between opposite pairs of blocks, the space between opposite pairs of blocks being less than the diameter of the fruit at one end of the machine and greater at the other end.

2. In a machine for sizing fruit, the combination of a pair of endless conveyers arranged to travel side by side in diverging paths, each of said conveyers having a series of supporting blocks and each of said blocks having a slot or recess in its under side and a guide strip engaging said recess for guiding said blocks.

3. In a machine for sizing fruit, the combination of a pair of endless conveyers arranged to travel side by side in diverging paths, each of said conveyers having a series of supporting blocks the opposite blocks being formed and spaced to support the fruit at more than two points of support, the space between the supporting blocks being less than the diameter of the fruit at one end of the machine and greater at the other.

In testimony whereof I have affixed my signature, in presence of two witnesses.

WALTER D. MURRAY.

Witnesses:
S. W. BATES,
C. B. CREIGHTON.

---

Copies of this patent may be obtained for five cents each, by addressing the "Commissioner of Patents, Washington, D. C."